April 22, 1958     E. L. WARNER     2,831,952

COOKING APPARATUS

Filed Feb. 6, 1956     4 Sheets—Sheet 1

INVENTOR.
ELMER L. WARNER
BY
Oberlin & Limbach
ATTORNEYS

April 22, 1958     E. L. WARNER     2,831,952
COOKING APPARATUS

Filed Feb. 6, 1956     4 Sheets-Sheet 2

INVENTOR.
ELMER L. WARNER
BY Oberlin & Limbach
ATTORNEYS

April 22, 1958

E. L. WARNER 2,831,952

COOKING APPARATUS

Filed Feb. 6, 1956

INVENTOR.
ELMER L. WARNER
BY
Oberlin + Limbach
ATTORNEYS

April 22, 1958     E. L. WARNER     2,831,952

COOKING APPARATUS

Filed Feb. 6, 1956     4 Sheets-Sheet 4

INVENTOR.
ELMER L. WARNER
BY
ATTORNEYS

United States Patent Office 2,831,952
Patented Apr. 22, 1958

2,831,952

COOKING APPARATUS

Elmer L. Warner, Crestline, Ohio, assignor to The Tappan Company, a corporation of Ohio Application February 6, 1956, Serial No. 563,700

12 Claims. (Cl. 219—10.47)

This invention relates to apparatus designed for cooking and more particularly to high-frequency ovens of the type disclosed in my co-pending application Serial No. 490,325, filed February 24, 1955.

As set forth in such prior application, ovens of this nature had previously been limited by the lack of practical and efficient means for surface browning or toasting food cooked therein, the high-frequency heating producing what has been referred to as a "deep" cooking effect in the food without the familiar browning of its exterior. A number of proposals, involving special preparatory treatment of the food as well as mechanical expedients, had been made to overcome such limitation, but these were unsatisfactory for various reasons, particularly with regard to suitability in units intended for domestic use. To be acceptable for use in the home, a high-frequency oven must not only incorporate means whereby browning may be accomplished, but such means must not unreasonably add to the cost of the unit, be inconvenient to operate, or require cumbersome and unsightly structure.

The construction disclosed and claimed in my noted earlier application provided the solution to this problem; contrary to theoretical expectations and warnings, I discovered that a properly constructed radiant heating device of simple nature could be disposed directly in the cooking cavity, that is, in exposure to the high-frequency energy, without wastefully and even destructively absorbing such energy and without adversely affecting the heat pattern produced thereby. An efficient cooling system was also provided to permit the use of such a radiant heating element of high capacity, and consequently improved efficiency, without unduly heating and possibly damaging the structure.

The preferred embodiment of such prior invention took the form of a floor-mounted oven assembly or one in which the oven proper was supported at a convenient elevation by a base cabinet portion within which much of the power generating and like equipment was housed. It is a primary object of the present invention to provide an oven which embodies the same basic principles but is especially suited to meet the different conditions presented in a wall mounting or built-in oven installation.

Another object is to provide a high-frequency oven, including my improved radiant heating means, in the form of an approximately cube-shaped unit of such overall size as to be conveniently mounted in a wall recess and the like, such unit incorporating all the components necessary for its operation in the desired manner.

It is a further object of the invention to provide such a unitary compact oven including a cooling system for extracting excess heat, this system likewise being particularly effective in a recess mounting of the oven.

An additional object is to provide apparatus in which both high-frequency and radiant heating are utilized, and wherein a forced circulation of air is created and caused to flow at least partially through the upper portion of the oven proper for cooling purposes.

To the accomplishment of the foregoing and related ends, said invention then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
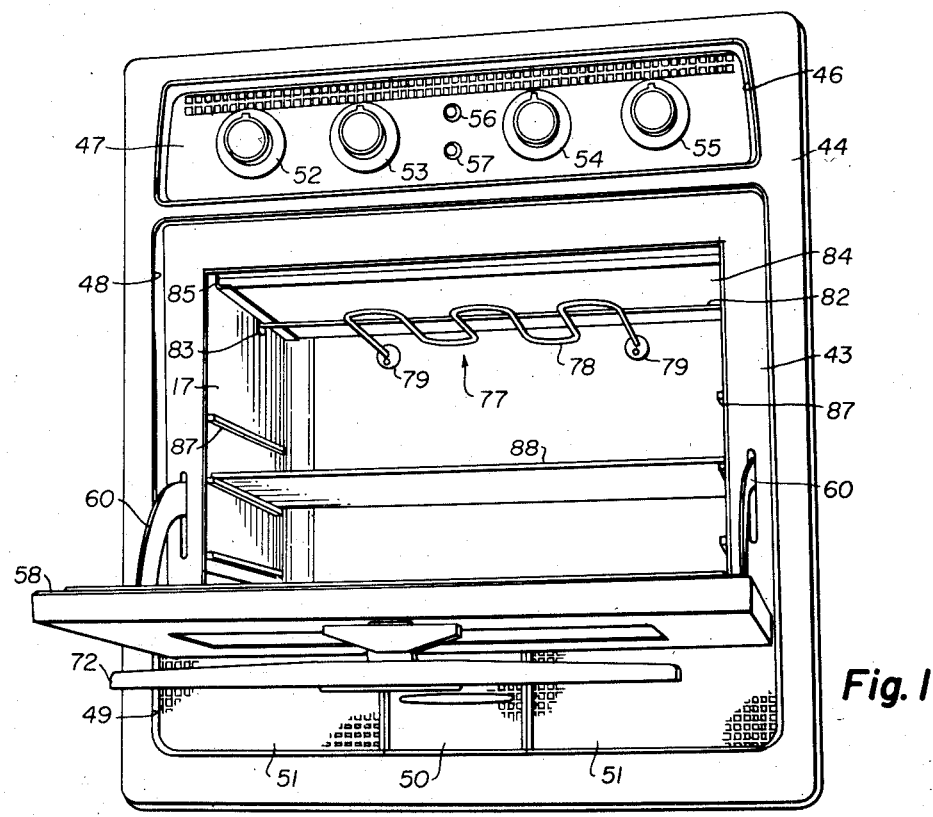
Fig. 1 is a front perspective view of an oven constructed in accordance with the present invention.

Referring now to the drawings in detail, the illustrated embodiment of the invention comprises an outer metallic casing, designated generally by reference numeral 10, which is approximately cubical and open at that side thereof which forms the front of the assembly. The casing thus includes bottom wall 11, top wall 12, and side walls 13, 14, and 15, the latter being disposed at the rear. Extending fore and aft within the casing at the respective sides of the same are two partitions 16 secured to and extending upwardly from the bottom wall 11, which serves as the main base of the assembly. These partitions mount an oven-defining metallic wrapper or enclosure 17, which likewise is approximately cubical and has an access opening 18 at one side, such wrapper being arranged with its opening generally coincident with the open front of the outer casing. The wrapper has an outer peripheral flange 19 overlying and attached to flanges 20 at the upper edges of the supports 16, thereby to hold the wrapper in place.

This oven wrapper or enclosure is of smaller size than the outer casing and, when positioned as indicated and illustrated, its walls are spaced inwardly of the corresponding casing walls to define therewith an enclosed space surrounding the wrapper. The oven is, of course, intended to provide cooking primarily and substantially completely by high-frequency electric and magnetic fields developed therein, and the means for generating the required energy, in the microwave region, includes a magnetron 21 supported between the rear walls of the oven wrapper and outer casing by a bracket 22 which is attached to the top wall of the wrapper. The magnetron itself is of conventional construction and power is supplied thereto in the usual manner by a pack, designated generally by reference numeral 23, supported on bottom wall 11 of the casing between the partitions 16 and comprising rectifier tubes, coupling transformers and other standard components. The input of this power pack is connected to a terminal block 24 mounted on the exterior or removed side of the partition 16 at the right of the unit as viewed from the front.

The top wall of the wrapper is provided with an opening 25 and a standard form of wave guide 26 extends between the magnetron and such opening for transmission of the microwave energy to the wrapper. Such energy is thus fed to the oven cavity at the top, the feed opening 25 being toward the rear and transversely central of the same. Also mounted on the rear wall of the wrapper 17, by means of a further bracket 27, is a blower 28 having an electric drive motor 29. The outlet of such blower is connected to a flexible conduit 30 which directs air through the magnetron assembly, for cooling thereof, and through a flexible curved exhaust duct 31 and an extension 32. The latter communicates with a thin L-shaped manifold 33 which is secured to top wall 12 of the outer casing and open at the front, where an up-turned projecting edge portion 34 deflects the warm exhaust air upwardly.

The blower drive motor 29 is also used to drive a vane type stirrer or mode changer 35 mounted for rotation in the upper portion of the oven cavity above the access opening 18. The stirrer assembly includes a shaft 36 which extends above the wrapper top and a pulley 37 thereon which is connected by a belt 38 to a drive pulley 39 on the blower motor shaft. The action of this mode changer is likewise well-known in the art and requires no further detailed description; it is sufficient here to note that the same causes variation in the high-frequency fields produced within the cavity, which has been found to enhance the heating effect in the food to be cooked.

A transverse baffle 40 having an opening 41 is arranged between the bottom walls of the oven wrapper and outer casing, and a suction fan 42 is disposed in such opening to draw air into the space between the two from the front of the assembly. Secured to the wrapper front about the access opening 18 is a trim member 43 which forms an outwardly directed peripheral flange portion at such opening, while a frame 44 is attached to the casing front. As illustrated, the latter projects at all sides of the casing with its margins 45 being rearwardly rounded for decorative finish.

Frame 44 defines an upper opening 46 within which a control panel 47 is mounted, an intermediate opening 48 which exposes the cavity access opening 18 and the flat trim 43 bounding the same, and a lower opening 49. Supported centrally beneath the oven wrapper is a small drawer 50 provided for storage of recipe cards and the like and being withdrawable through the lower frame opening 49. To each side of the drawer, this opening is partially closed by decorative plates 51 having perforations for entry of the air drawn into the casing by the suction fan 42. The upper panel 47 supports controls 52, 53, 54 and 55 and signal lights 56 and 57 used to determine and indicate operating conditions of the oven, to be discussed further hereinafter.

Closure of the oven cavity access is provided by a door 58 hinged at its bottom edge to the front frame 44 at the bottom of opening 48 in the same, the door fitting within such opening and overlying the trim 43 about the wrapper access 18 when in closed condition. This door comprises a reticulated body plate 59 the openings of which are so related in size to the wavelength of the high-frequency energy employed as to function as chokes, thereby to preclude passage of such energy through the same. The door holding and balancing means comprises side levers 60 which extend into the casing 10 through slots in the wrapper front trim 43, rollers 61 mounted on slides 62 to ride on the upper edges of the levers, and springs 63 attached to the slides for resiliently holding the rollers thus engaged with the levers. When the rollers are seated in lever edge notches 64, the door is held tightly closed; engagement of toes 65 on the levers with the rollers supports the door in open horizontal condition.

Figure 7:
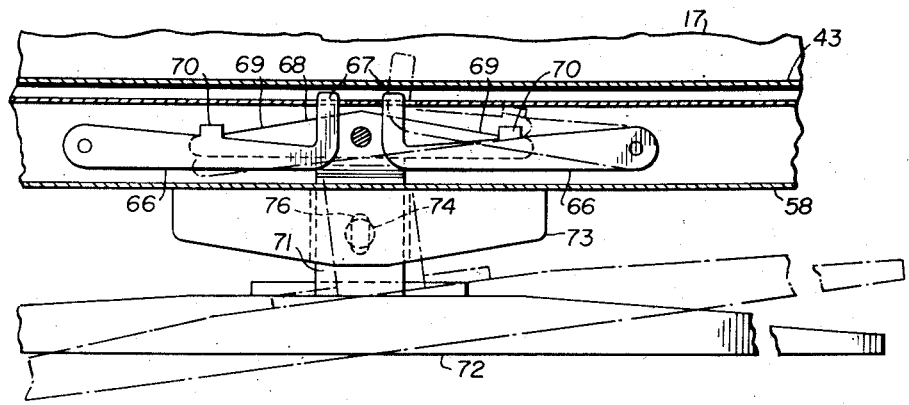
Fig. 7 is a sectional view taken on the plane of the line 7—7 in Fig. 6.

The spring action provides such a tight closure, which is highly desirable, that a camming assembly affording a mechanical advantage is used initially to break the seal. This mechanism comprises two pivoted arms 66 having free end stubs 67 adapted to project from their normal positions substantially entirely within the door near the top of the same, into engagement with the trim 43 at such region. A cam member 68 is pivoted within the door and has wings 69 adapted to engage down-turned tabs 70 of the arms 66, thereby to rock the latter. The cam 68 includes a portion 71 which projects from the door front and an operating handle 72 is secured thereto, a canopy 73 hiding the cam projection. As will be apparent from Fig. 7, wherein the handle is shown both in normal condition and actuated to one side, pushing or pulling of the same at either side will rock one of the arms to cause its stub 67 to bear against the wrapper trim and thus force the top of the door outwardly. A small ball 74 supported on a strap 75 beneath the cam projection 71 cooperates with a slot 76 in the latter to maintain the handle normally in parallelism with the door front.

As in the construction disclosed in my aforesaid copending application, a serpentine metal-sheathed resistance unit 77 is disposed in the oven cavity for browning of the food by radiant heating. The respective ends of the sheath 78 are secured to the rear wall of the wrapper in the upper portion of the same in such manner as to provide an extremely good electrical bonding of the two. For such purpose, the sheath ends are welded or soldered to metal discs 79 which are in turn attached tightly to the wrapper wall, such discs increasing the contact area thereby to enhance both the electrical bonding and the mechanical support of the two ends of the radiant heating device. The resistance element 80 thereof includes terminal portions 81 which extend through the wrapper wall interiorly of these joints for connection to a conventional source of supply.

The radiant heater 77 is arranged substantially horizontally in the upper region of the oven cavity and occupies a major portion of the area of the same. Additional support of the device and electrical connection of the sheath and the wrapper 17 are provided by a metal rod 82 transversely overlying the spaced turns of the heater and attached at its ends respectively to the wrapper side walls. The rod is welded or soldered at the points of intersection with the heater convolutions and discs 83 are employed at its ends similarly as at the ends of the heater sheath. The oven wrapper is electrically grounded in this type of construction and its dimensions are so great with respect to the wavelength of the microwave energy that its walls are reflective thereof.

The metal sheath 78, it will be noted, is exposed to the high-frequency energy, the latter actually being fed to the oven cavity through the area occupied by the radiant heater. The length of such sheath should also be related to the wavelength of the high-frequency energy and since there are multiple points of electrical connection between the sheath and the wrapper, the individual sections between such points, at ground potential, should be dimensioned so as to constitute detuned elements at the high frequencies employed, which may, for example, be on the order of 2500 megacycles. This relationship is more significant in a construction where the magnetron feed is at the top or through the radiant heater than where such feed is at a point considerably removed from the same.

Substantially immediately above the radiant heating device there is mounted a reflector sheet or plate 84 which is made of a material substantially transparent to the high-frequency energy, for example, a pure silica glass. This plate is supported at its sides by small angles 85 attached to the wrapper side walls and its rear edge abuts the rear wall of the wrapper. The plate, which is substantially in the plane of the top of the oven access opening 18 is, however, spaced at its front edge from the wrapper front wall portion 86 for a purpose to be described.

As its name denotes, the plate 84 functions to reflect the upwardly propagated radiant heat generated by the browning unit 77 and thus protects the mode changer 35 and other parts at the top of the wrapper from excessive heating. Each side wall of the wrapper is provided with a series of vertically spaced glides 87 at corresponding elevations for mounting a support tray or plate 88 which is likewise of a low-loss dielectric material, such tray being adapted to receive and support the food to be cooked.

Figure 2:
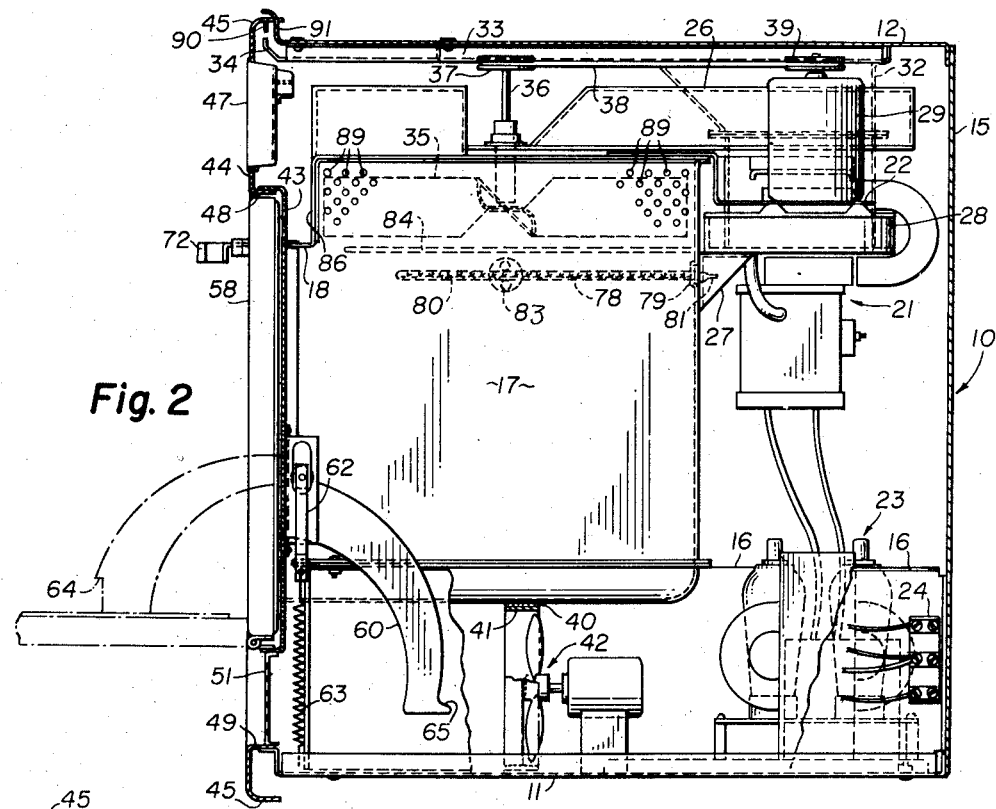
Fig. 2 is a vertical section thereof taken on a plane just inside one of the outer side walls of the unit.
Figure 3:
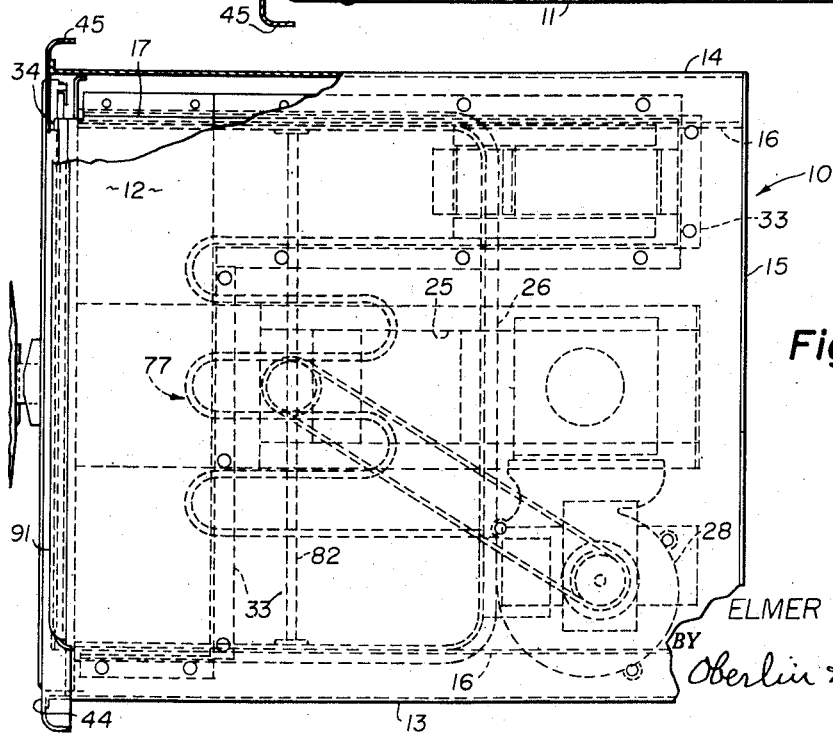
Fig. 3 is a top plan view of the unit, shown partially fragmented for convenience of illustration.
Figure 4:
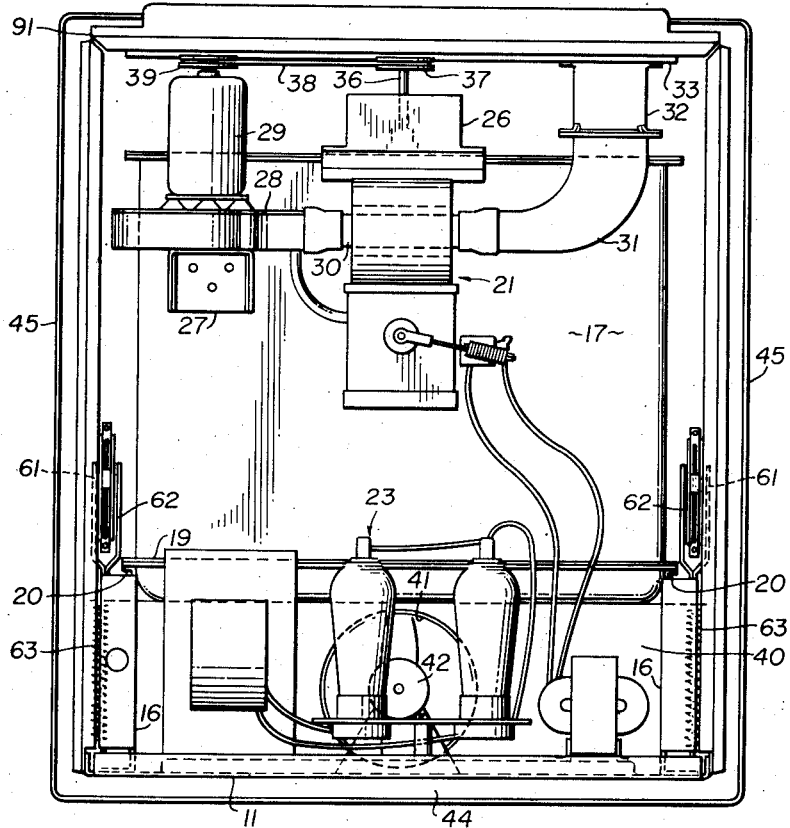
Fig. 4 is a view in elevation from the rear of the unit with the wall at such side removed.
Figure 6:
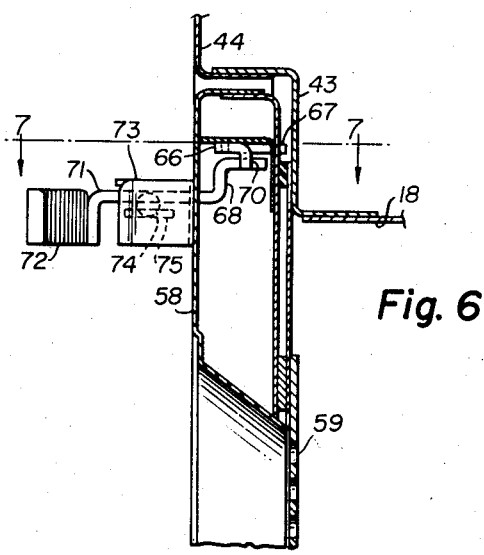
Fig. 6 is a transverse fragmented section of such door.
Figure 5:
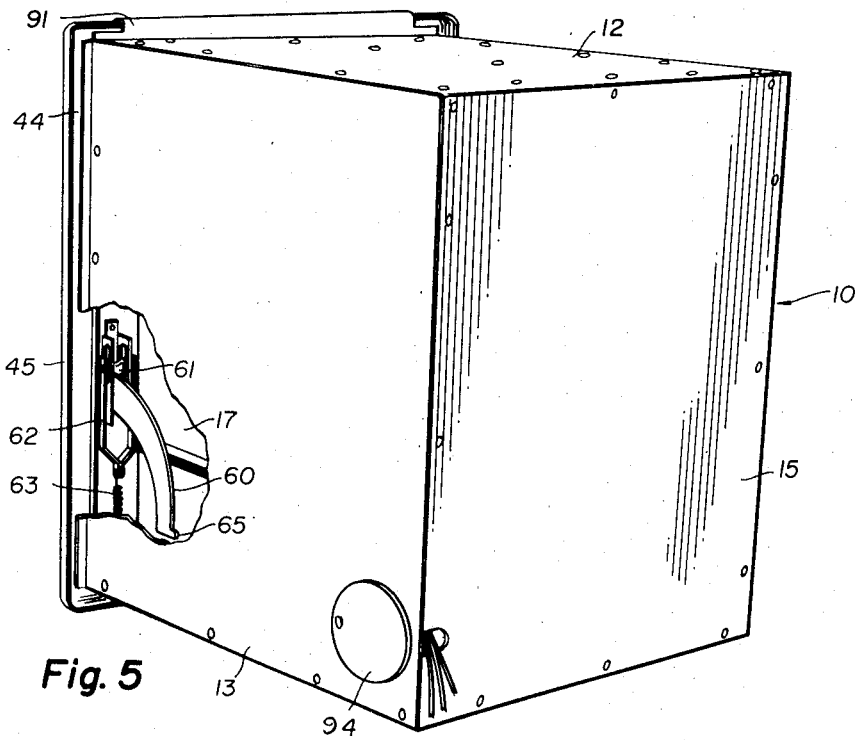
Fig. 5 is a rear perspective view with a portion of one of the outer walls broken away to illustrate certain inner mechanism operatively associated with the door of the unit.

The wrapper side walls are provided in their upper portions with small openings 89 which also are so related to the wavelength of the high-frequency energy as to act as chokes. It will accordingly be seen that the suction fan 42 is operative to draw air in through the lower front grille sections 51 and that such air flows upwardly about the outer surface of the wrapper 17 thereby to extract non-useful heat from the same. At least a portion of this air will flow through the openings 89 into the upper region of the oven cavity, through the gap between the reflector 84 and the wrapper front wall portion 86, and out through the perforations of the door. The top flange of the front frame 44 of the assembly is cut and bent downwardly over an intermediate extent to form a baffle 90 which is above, in spaced relation, the up-turned projection 34 of the exhaust manifold 33 through which the magnetron cooling air flows. A cooperable upwardly and outwardly curved baffle 91 is attached to the top wall 12 of the outer casing, as shown most clearly in Fig. 2, whereby the manifold exhaust air is directed to the front. It will also be seen that a portion of the air flowing over the outside of the wrapper 17 or in the space between the same and the outer casing 10 will be exhausted through the just-described baffling at the top front of the assembly.

By such circulation means, it is possible to use a radiant heating device of relatively high capacity without danger of excessively heating the adjoining portions and parts of the construction. The circulation is moreover particularly suited for the intended wall mounting of the unit, the air being both drawn in and expelled at the front.

Figure 8:
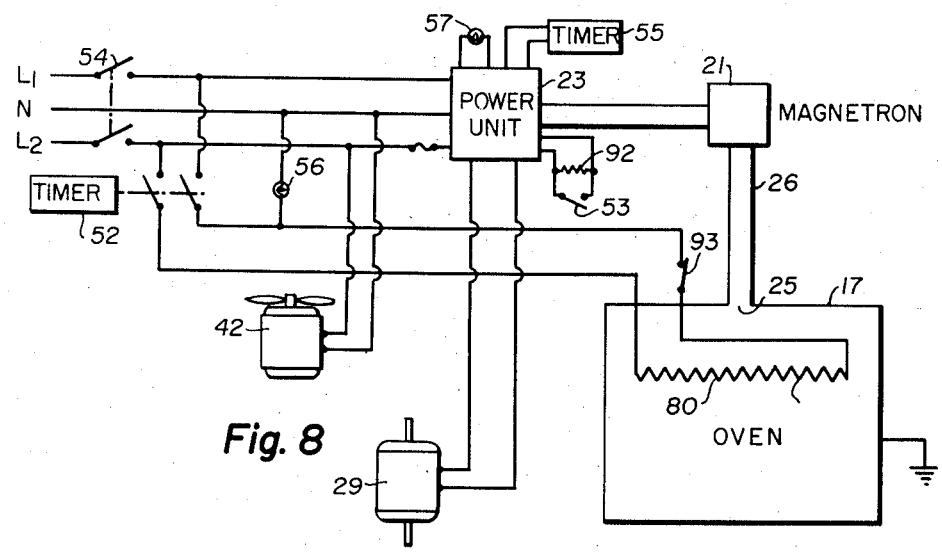
Fig. 8 is a schematic diagram of control circuits used with the oven.

The manner in which the "deep" cooking by the microwave energy and the surface browning by the radiant heater are controlled will be evident from the schematic diagram of Fig. 8. As there shown, the power package 23 for supplying the necessary high voltage to the magnetron is connected to a three-wire source, comprising the conductors $L_1$, $L_2$ and N, through the main switch 54 mounted on the front control panel 47. When such switch is closed, the power unit is energized to place the magnetron in "stand by" condition, the tell-tale light 57 indicates the same, and both blower motor 29 and the suction fan 42 are enegized. An adjustable timer, the control 55, is operative to complete the power connection between the unit 23 and the magnetron and to maintain the same for high-frequency cooking periods of selected duration. The power unit includes an impedance, shown as resistor 92, which may selectively be inserted in the circuit or effectively withdrawn by operation of shunt switch 53 to provide respectively low and high levels of the high-frequency heating, in conventional manner.

The resistance heating element 80 is connected across the line conductors $L_1$ and $L_2$ through a switch controlled by timer 52, whereby the interval of radiant heating may be adjustably determined. Signal lamp 56 indicates energization of the browning unit and a safety thermostat 93, preferably mounted on the top wall of the oven wrapper, is in series with the element 80. Since the motor 29 and the suction fan 42 are both energized upon closing of the main switch, the magnetron and the oven are air-cooled in the manner set forth whenever the unit is operative. It will be understood that such timers, switches and the like are selected from commercially available devices suited for their respective intended functions. An opening in the casing side wall 13 which is normally closed by a plate 94 provides access to the terminal block 24 and its immediate region only. That is, the block mounting on partition 16 and such opening are arranged to prevent, for safety reasons, normal access to the high-voltage region of the power pack 23.

The new construction, in its entirety, will be seen to provide a self-contained, fully operative oven unit which may very readily be handled and installed in a built-in wall cavity or on top of low kitchen counters. The front frame of the assembly would, of course, overlie such a wall about the cavity within which the unit is placed and present a pleasing exterior. Regardless of the particular type of mounting employed, no problems as to the arrangement and support of associated equipment are presented, nor is there any possibility of interference with the circulation of the cooling air.

With respect to the control of the oven, it will be appreciated that various scheduling of the cooking and browning operations may be provided, with the two effects being interrelated in any desired manner or predeterminable completely independently of each other. By virtue of the efficient cooling system preferably employed, and the resultant improved capacity and efficiency of the radiant heating device, the controls may be interrelated so as to supply the radiant heat for only a portion of the microwave cooking period.

Other modes of applying the principle of the invention may be employed, change being made as regards the details described, provided the features stated in any of the following claims, or the equivalent of such, be employed.

I therefore particularly point out and distinctly claim as my invention:

1. Cooking apparatus comprising a casing having an opening at one side and adapted to be mounted in a wall recess and the like with such open side at the front of the assembly, an oven-defining metallic enclosure having an access opening, said enclosure being supported within the casing with such access opening at the front and its inner walls spaced from the corresponding walls of the casing, high-frequency electromagnetic energy generating means within the casing externally of the oven enclosure, means for feeding such energy to the interior of the enclosure through an opening provided for the purpose in the top wall thereof, a closure for the oven access opening in the form of a door having perforations of such size in relation to the wave-length of the high-frequency energy as to preclude passage of the energy through the same, a radiant heating unit supported within the upper portion of the oven enclosure in exposure to the thus supplied high-frequency energy, said unit including a continuous serpentine metal sheath and a resistance element within and insulated from said sheath, the ends of the sheath being conductively joined to the enclosure and the resistance element having terminal sections which pass interiorly of such joints through the enclosure for connection to a conventional source of electrical energy, the upper portion of the oven enclosure being provided with a series of holes likewise of such size as to preclude escape of the high-frequency energy, and blower means arranged between the enclosure and the casing, said blower means being operative to draw air into the space surrounding the enclosure from bottom front of the casing opening, such cooling air flowing about the enclosure with a portion thereof being exhausted through the door perforations after flowing through the holes and upper portion of the enclosure, the casing having an outlet at the top front of the same through which the remainder of the air circulated in the casing is exhausted.

2. Cooking apparatus comprising a casing having an opening at one side and adapted to be mounted in a wall recess and the like with such open side at the front of the assembly, an oven-defining metallic enclosure having an excess opening, said enclosure being supported within the casing with such access opening at the front and its inner walls spaced from the corresponding walls of the casing, high-frequency electromagnetic energy generating means within the casing externally of the oven enclosure, means for feeding such energy to the interior of the enclosure through an opening provided for the purpose in the top wall thereof, a closure for the oven access opening in the form of a door having perforations of such size in relation to the wave length of the high-frequency energy as to preclude passage of the energy through the same, a radiant heating unit supported within the upper portion of the oven enclosure in exposure to the thus supplied high-frequency energy, said unit including a continuous serpentine metal sheath and a resistance element within and insulated from said sheath, the ends of the sheath being conductively joined to the enclosure and the resistance element having terminal sections which pass interiorly of such joints through the enclosure for connection to a conventional source of electrical energy, the upper portion of the oven enclosure being provided with a series of holes likewise of such size as to preclude escape of the high-frequency energy, and blower means arranged between the enclosure and the casing, said blower means being operative to draw air into the space surrounding the enclosure from bottom front of the casing opening, such cooling air flowing about the enclosure, through the holes in the upper portion of the same, and out through the perforations in the door.

3. Cooking apparatus comprising a casing having an opening at one side and adapted to be mounted in a wall recess and the like with such open side at the front of the assembly, an oven-defining metallic enclosure having an access opening, said enclosure being supported within the casing with such access opening at the front and its inner walls spaced from the corresponding walls of the casing, high-frequency electromagnetic energy generating means within the casing externally of the oven enclosure, means for feeding such energy to the interior of the enclosure through an opening provided for the purpose in the top wall thereof, a closure for the oven access opening in the form of a door having perforations of such size in relation to the wavelength of the high-frequency energy as to preclude passage of the energy through the same, a radiant heating unit supported within the upper portion of the oven enclosure in exposure to the thus supplied high-frequency energy, said unit including a continuous serpentine metal sheath and a resistance element within and insulated from said sheath, the ends of the sheath being conductively joined to the enclosure and the resistance element having terminal sections which pass interiorly of such joints through the enclosure for connection to a conventional source of electrical energy, the upper portion of the oven enclosure being provided with a series of holes likewise of such size as to preclude escape of the high-frequency energy, and blower means arranged between the enclosure and the casing, said blower means being operative to produce circulation of cooling air in the space surrounding the oven enclosure, through the holes in the upper portion of the same, and through the perforations of the door.

4. Cooking apparatus comprising an outer casing open at one side thereof, an oven-defining metallic enclosure within and spaced from said outer casing, said enclosure having an access opening generally coincident with the open side of the casing and a closure therefor, high-frequency electromagnetic energy generating means within the casing externally of the oven enclosure, means for feeding such energy to the interior of the enclosure through an opening provided for the purpose in the top wall thereof, a radiant heating unit supported within the upper portion of the oven enclosure in exposure to the thus supplied high-frequency energy, said unit including a continuous serpentine metal sheath and a resistance element within and insulated from said sheath, the ends of the sheath being conductively joined to the enclosure and the resistance element having terminal sections which pass interiorly of such joints through the enclosure for connection to a conventional source of electrical energy, and blower means operative to circulate air through the space between the casing and enclosure, the casing being provided with an inlet and an outlet for such flow of air.

5. Cooking apparatus comprising an outer casing open at one side thereof, an oven-defining metallic enclosure within and spaced from said outer casing, said enclosure having an access opening generally coincident with the open side of the casing and a closure therefor, high-frequency electromagnetic energy generating means within the casing externally of the oven enclosure, means for feeding such energy to the interior of the enclosure through an opening provided therein for the purpose, a radiant heating unit supported within the upper portion of the oven enclosure in exposure to the thus supplied high-frequency energy, said unit including a continuous serpentine metal sheath and a resistance element within and insulated from said sheath, the ends of the sheath being conductively joined to the enclosure and the resistance element having terminal sections which pass interiorly of such joints through the enclosure for connection to a conventional source of electrical energy, and blower means operative to circulate air through the space between the casing and enclosure, the casing being provided with an inlet and an outlet for such flow of air.

6. Cooking apparatus comprising an outer casing open at one side thereof, an oven-defining metallic enclosure within and spaced from said outer casing, said enclosure having an access opening generally coincident with the open side of the casing, high-frequency electromagnetic energy generating means within the casing externally of the oven enclosure, means for feeding such energy to the interior of the enclosure through an opening provided therein for the purpose, a closure for the oven access opening in the form of a door having perforations of such size in relation to the wavelength of the high-frequency energy as to preclude passage of the energy through the same, a radiant heater supported within the upper portion of the oven enclosure, such upper portion being provided with perforations similarly as said closure, and blower means arranged between the enclosure and the casing, said blower means being operative to produce circulation of cooling air in the space surrounding the oven enclosure, through the holes in the upper portion of the same, and through the perforations of the door.

7. Cooking apparatus comprising an outer casing open at one side thereof, an oven-defining metallic enclosure within and spaced from said outer casing, said enclosure having an access opening generally coincident with the open side of the casing, high-frequency electromagnetic energy generating means within the casing externally of the oven enclosure, means for feeding such energy to the interior of the enclosure through an opening provided therein for the purpose, a closure for the oven access opening in the form of a door having perforations of such size in relation to the wavelength of the high-frequency energy as to preclude passage of the energy through the same, a radiant heater supported within the upper portion of the oven enclosure, such upper portion being provided with perforations similarly as said closure, and blower means arranged between the enclosure and the casing, said blower means being operative to draw air into the space surrounding the enclosure from bottom front of the casing opening, such cooling air flowing about the enclosure, through the holes in the upper portion of the same, and out through the perforations in the door.

8. A high-frequency oven comprising an outer casing of approximately cube shape, a metal liner supported and forming a heating chamber within said outer casing, the liner being spaced from the casing and both being provided with access openings at corresponding sides, means in the space between the two for radiating high-frequency electromagnetic energy into the liner through an opening in the top of the same, a radiant heating unit mounted in the upper portion of the liner in exposure to such energy, said unit comprising a resistance element and a closely surrounding sheath of electrically conductive material the ends of which are connected to the liner, the resistance element being insulated from the sheath, and a plate supported in the liner between the top of the same and the radiant heating unit, said plate being made of a material which is substantially transparent to the high-frequency energy.

9. A high-frequency oven comprising an outer casing of approximately cube shape, a metal liner supported and forming a heating chamber within said outer casing, the liner being spaced from the casing and both being provided with access openings at corresponding sides, means in the space between the two for radiating high-frequency electromagnetic energy into the liner through a feed opening provided in the upper portion of the same, a radiant heating unit mounted in the upper portion of the liner in exposure to such energy, said unit comprising a resistance element and a closely surrounding sheath of electrically conductive material the ends of which are connected to the liner, the resistance element being insulated from the sheath, and a plate supported in the liner between the top of the same and the radiant heating unit, said plate being made of a material which is substantially transparent to the high-frequency energy.

10. A high-frequency oven comprising an outer casing of approximately cube shape, a metal liner supported and forming a heating chamber within said outer casing, the liner being spaced from the casing and both being provided with access openings at corresponding sides, means in the space between the two for radiating high-frequency electromagnetic energy into the liner through an opening in the top of the same, and a radiant heating unit mounted in the upper portion of the liner in exposure to such energy, said unit comprising a resistance element and a closely surrounding sheath of electrically conductive material the ends of which are connected to the liner, the resistance element being insulated from the sheath.

11. In high-frequency oven construction, an enclosure comprising top, bottom and side walls made of metal, means for supplying high-frequency energy to said enclosure through an opening provided in such top wall, thereby to produce standing electromagnetic field waves throughout the enclosure, a continuous tubular member of small diameter mounted in the upper portion of the enclosure, said member being made of electrically conductive material and having the ends of its extent within the enclosure conductively sealed thereto, and a resistance heating element within said tubular member adapted to be connected to a conventional source of supply, said resistance heating element being insulated from the tubular member.

12. In high-frequency oven construction, an enclosure comprising top, bottom and side walls made of metal, means for supplying high-frequency energy to said enclosure through an opening provided in such top wall, thereby to produce standing electromagnetic field waves throughout the enclosure, a continuous tubular member of small diameter mounted in the upper portion of the enclosure, said member being made of electrically conductive material and having the ends of its extent within the enclosure conductively sealed thereto, a resistance heating element within and insulated from said tubular member, and means for circulating cooling air against the outer surfaces of the enclosure walls.

References Cited in the file of this patent

UNITED STATES PATENTS

| | | |
|---|---|---|
| 2,716,694 | Schroeder | Aug. 30, 1955 |
| 2,748,239 | Long et al. | May 29, 1956 |